(12) United States Patent
Albert et al.

(10) Patent No.: US 8,451,990 B2
(45) Date of Patent: May 28, 2013

(54) METHOD, SYSTEM AND APPARATUS FOR STORING VOICEMAIL

(75) Inventors: John Albert, Kanata (CA); Jerry Yin, Ottawa (CA); Kavita Jain, Napean (CA); Zhou Liang, Kanata (CA); Thomas A. Gray, Mansfield (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 983 days.

(21) Appl. No.: 12/456,670

(22) Filed: Jun. 18, 2009

(65) Prior Publication Data

US 2010/0322394 A1 Dec. 23, 2010

(51) Int. Cl.
*H04M 11/00* (2006.01)
*H04L 12/58* (2006.01)

(52) U.S. Cl.
CPC ............. *H04M 11/00* (2013.01); *H04L 12/589* (2013.01); *H04M 2203/4536* (2013.01)
USPC .................. 379/88.13; 379/88.11; 379/88.17; 379/88.23; 379/90.01; 379/355.04; 455/413; 702/187; 704/270; 705/14.26; 709/205; 709/206; 711/754; 726/4

(58) Field of Classification Search
CPC ............. H04L 12/589; H04M 3/53333; H04M 2203/4536; H04M 11/00
USPC .......... 379/88.11, 88.13, 88.17, 88.23, 88.12, 379/88.22, 90.01, 355.04; 455/413; 702/187; 704/270; 705/14.26; 709/205, 206; 711/154; 726/4

See application file for complete search history.

(56) References Cited

U.S. PATENT DOCUMENTS

| 5,557,659 | A | | 9/1996 | Hyde-Thomson | |
|---|---|---|---|---|---|
| 5,647,002 | A | * | 7/1997 | Brunson | 709/206 |
| 6,240,391 | B1 | * | 5/2001 | Ball et al. | 704/270 |
| 6,393,107 | B1 | * | 5/2002 | Ball et al. | 379/88.13 |
| 6,459,774 | B1 | * | 10/2002 | Ball et al. | 379/67.1 |
| 6,519,327 | B1 | * | 2/2003 | Cannon et al. | 379/88.22 |
| 6,775,781 | B1 | * | 8/2004 | Phillips et al. | 726/4 |
| 6,873,936 | B2 | * | 3/2005 | Reel et al. | 702/187 |
| 6,956,942 | B2 | * | 10/2005 | McKinzie et al. | 379/355.04 |
| 7,194,511 | B2 | * | 3/2007 | Stettner | 709/205 |
| 7,334,090 | B2 | * | 2/2008 | Zellner | 711/154 |
| 7,412,037 | B2 | * | 8/2008 | Mullis et al. | 379/88.12 |
| 7,493,269 | B2 | * | 2/2009 | Fostick et al. | 705/14.26 |
| 7,702,082 | B2 | * | 4/2010 | Mullis et al. | 379/88.12 |
| 8,077,842 | B2 | * | 12/2011 | Patel et al. | 379/88.23 |
| 8,103,253 | B2 | * | 1/2012 | Gatzke et al. | 455/413 |
| 8,107,603 | B2 | * | 1/2012 | McLarty et al. | 379/90.01 |
| 8,204,185 | B1 | * | 6/2012 | Koltenuk | 379/88.23 |
| 8,238,526 | B1 | * | 8/2012 | Seth et al. | 379/88.11 |
| 2002/0085690 | A1 | * | 7/2002 | Davidson et al. | 379/88.17 |
| 2010/0322394 | A1 | * | 12/2010 | Albert et al. | 379/88.13 |

* cited by examiner

Primary Examiner — Gerald Gauthier

(57) ABSTRACT

A method and apparatus, and system for storing voicemail data are provided. Voicemail data is generated at a telephony device engaged in a communication session with a calling telephony device, the voicemail data comprising a voice message. E-mail data is then automatically generating after the voicemail data is generated, the e-mail data comprising data identifying the voicemail data, the e-mail data further comprising the voicemail data. The e-mail data is then transmitted to a network address associated with a remote e-mail server, such that the e-mail data, including the voicemail data, is stored at the remote e-mail server.

22 Claims, 5 Drawing Sheets

METHOD, SYSTEM AND APPARATUS FOR STORING VOICEMAIL

FIELD

The specification relates generally to voicemail systems, and specifically to a method, apparatus and system for storing voicemail data.

BACKGROUND

Voicemail has become an ubiquitous feature of communication systems, and is often considered essential within even the smallest of office environments. However, an office voicemail system generally requires a voicemail server to centrally store and manage voicemail data. The voicemail server connects to the office communication system through one or more analog or digital trunks. Calls that are to receive voicemail treatment are forwarded over these trunks to the voicemail server. Called party information can be transferred to the voicemail server as trunk signalling or over special purpose analog or digital signalling connections. High-capacity and high-capability servers provide a useful service for larger office/installations; however smaller in installations/offices the expense of such servers can severely limit system affordability, especially when central access to a voicemail server is a necessary feature.

BRIEF DESCRIPTIONS OF THE DRAWINGS

Embodiments are described with reference to the following figures, in which.

DETAILED DESCRIPTION OF THE EMBODIMENTS

Figure 1:
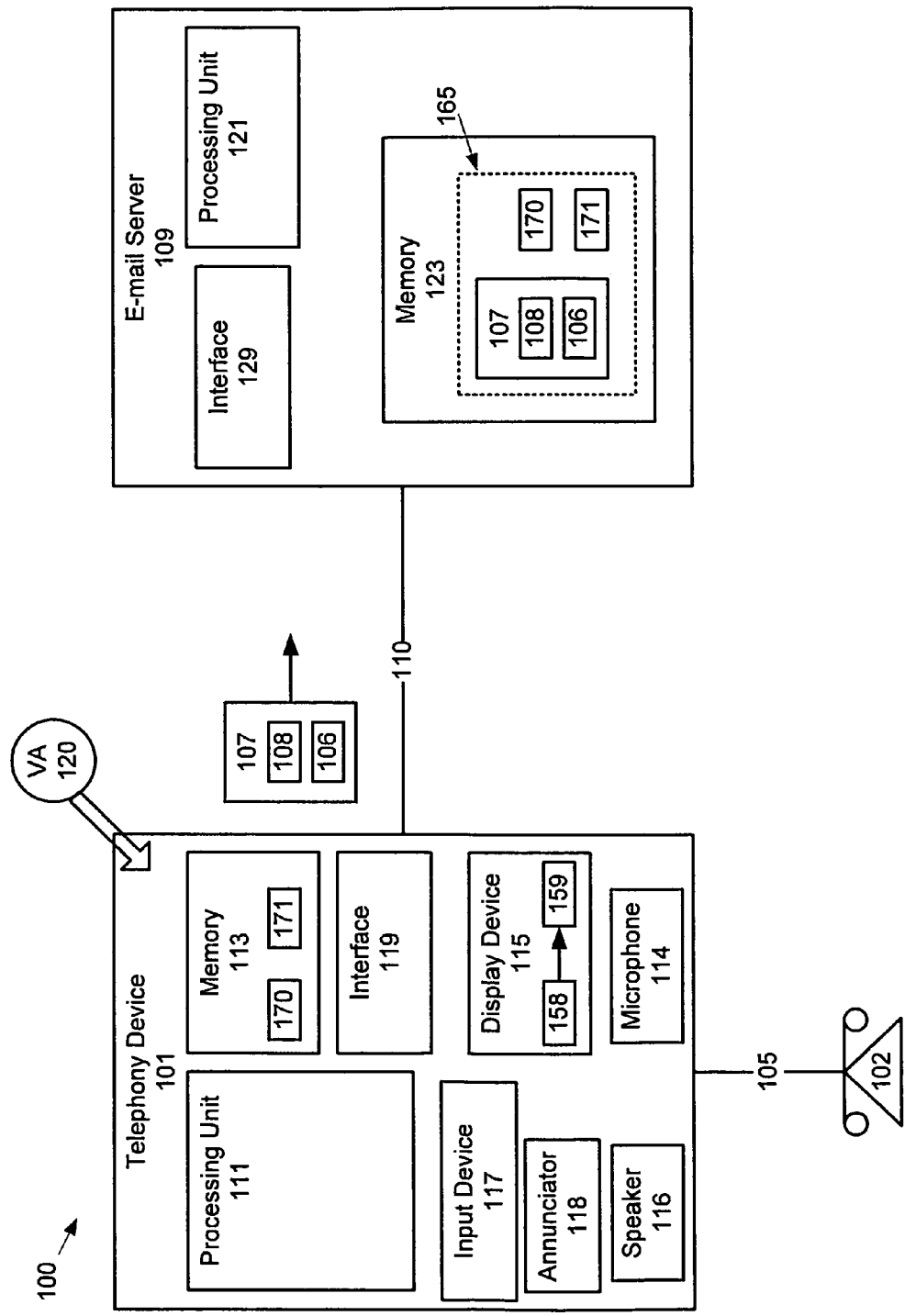
FIGS. 1, 4 and 5 depict block diagrams of systems for storing and/or retrieving voicemail, according to non-limiting embodiments.

FIG. 1 depicts a system 100 for storing voicemail, according to non-limiting embodiments, for example when a first telephony device 101 is called by a second telephony device 102 via a link 105. Telephony device 101 is generally enabled to generate voicemail data 106 during a communication session between telephony devices 101, 102. Telephony device 101 is further enabled to generate e-mail data 107, comprising voicemail data 106 and data identifying voicemail data 106. In some embodiments, such data identifying voicemail data comprises header data 108, though the use of header data 108 to identify voicemail data 106 is not to be considered unduly limiting. For example, data identifying voicemail data 106 can also be embedded in the body of e-mail data 107, or in any other suitable manner. In any event, telephony device 101 is further enabled to transmit e-mail data 107 to an e-mail server 109, via a link 110, for storage at e-mail server 109. The voicemail data 106 is then also stored at e-mail server 109. Telephony device 101 can be further generally enabled to retrieve header data 108 from e-mail server 109 such that voicemail data 106 stored at e-mail server 109 can be identified at telephony device 101. Telephony device 101 can be yet further generally enabled to retrieve e-mail data 107, including voicemail data 106, such that voicemail data 106 can be processed and/or played at telephony device 101.

Telephony device 101 generally comprises a processing unit 111 a memory 113, a microphone 114, a display device 115, speaker 116, an input device 117, an annunciator 118 and a communications interface 119, interconnected with processing unit 111, for example via a computer bus. Telephony device 101 can further comprise a voicemail application 120, which can be stored in memory 113 and processed by processing unit 111; upon processing voicemail application 120, telephony device 101 is enabled to generate voicemail data 106 (e.g. record voicemail). In yet further embodiments, voicemail application 120 can be embodied in a combination of hardware and software elements at telephony device 101, dedicated to generating voicemail data 106.

Telephony device 102 comprises any telephony device which can call telephony device 101 via link 105 (e.g. cause a communication session to be established). Link 105 can comprise any suitable wired or wireless link, as desired, suitable for establishing a communication session between telephony devices 101, 102, such that voicemail data 106 can be generated at telephony device 101. In some embodiments telephony device 102 is similar to telephony device 101.

In some embodiments, each of telephony device 101 and telephony device 102 can comprise, but is not limited to, a telephony device such as a VoIP enabled telephony device, a communications device, a digital telephone, a smart phone, a computing device, PDA, a portable communications device, a portable computing device, a mobile telephone, a cell phone and the like, or a combination. In some embodiments telephony device 101 can be associated with an entity such as a business, a small business, a home office, and the like however such an association is not be considered particularly limiting.

E-mail server 109 generally comprises a processing unit 121 interconnected with a memory 123 and a communications interface 129, for example via a computer bus. It is generally understood that an account 165 can be provisioned at e-mail server 109, account 165 associated with a username 170 and password 171 within memory 123, account 165 for storing e-mail. In general, username 170 and password 171 can be issued and/or chosen during a provisioning process, and e-mail stored in association with account 165 can be accessed via any suitable device having internet access. The username 170 and password 171 can be stored in memory 113 in a provisioning process at telephony device 101. In some embodiments, e-mail server 109 can comprise a commercial-of-the-shelf (COTS) e-mail server. In other embodiments e-mail server 109 can comprise a POP3 e-mail server. In yet further embodiments e-mail server 109 can comprise a webmail server operated by an entity different from an entity with which telephony device 101 is associated. For example, in some of these embodiments, e-mail server 109 can be operated by an entity offering free webmail accounts, such accounts being available upon request via a provisioning process wherein username 170 and password 171 is issued and/or chosen.

Processing unit 111 and processing unit 121 can comprise any suitable processor, including but not limited to a central processing unit (CPU).

Memory 113 and memory 123 can each comprise any suitable memory including but not limited to volatile memory, non-volatile memory, read-only memory (ROM), random access memory (RAM), flash memory, removable memory, a hard disk, and the like.

Display device 115 can comprise any suitable display device, including, but not limited to, any suitable combination of CRT and/or flat panel displays (e.g. LCD, plasma and the like). Display device 115 can comprise circuitry 158 for generating a representation 159 of data, as will be described below with reference to FIG. 3. For example, representation 159 can comprise a representation of header data 108, for example within a graphical user interface (GUI) once header data 108 is retrieved from e-mail server 109. Circuitry 158 can comprise any suitable combination of circuitry for controlling a CRT and/or flat panel displays etc., including but not limited to display buffers, transistors, electron beam controllers, LCD cells, plasmas cells, phosphors etc. Display device 115 and circuitry 158 can be controlled by processing unit 111 to generate representation 159.

Input device 117 can comprise any suitable input device for accepting input data including but not limited to button(s), a keyboard, a track ball, a scroll wheel and/or a combination. In particular input data received via input device 117 can be processed to indicate a selection of a representation of header data 108 provided within representation 159.

Interface 119 and interface 129 can each comprise any suitable combination of wired or wireless interface as desired. In particular, interface 119 and interface 129 enables communication between calling telephony device 101 and e-mail server 109 via link 110. Link 110 can be wireless, wired or a combination, as desired, and can comprise any suitable combination of wired communication networks and wireless communication networks. Each of interface 119 and interface 129 is generally compatible with link 110. That is, link 110 comprises a wireless communication network, interface 119 and/or interface 129 are enabled to communicate wirelessly, using any suitable protocol; and/or if link 110 comprises a wired network, then interface 119 and/or interface 129 are enabled to communicate using any suitable wired protocol. In some embodiments, one of interface 119 and interface 129 can be enabled to communicate wirelessly while the other of interface 119 and interface 129 can be enabled for wired communications.

Similarly, interface 119 further enables communication between telephony device 101 and telephony device 102 via link 105, link 105 being wired, wireless, or a combination as desired, similar to link 105.

It is generally understood that each of telephony devices 101, 102 and e-mail server 109 are associated with at least one network address for establishing communication therebetween. In some embodiments, telephony devices 101, 102 can each be associated with a telephone number such that telephony communication sessions can be established therebetween. Further, in some embodiments, each of telephony device 101 and e-mail server 109 can be associated with an IP address such that e-mail can be exchanged therebetween. In some embodiments, the network address of e-mail server 109 can comprise, without limitation an IP address, a URL and the like. In yet further embodiments, telephony devices 101, 102 and e-mail server 109 are associated with an IP address, and telephony communication sessions between telephony devices 101, 102 can be established via their respective IP addresses; furthermore e-mail can be exchanged between telephony devices 101, 102 and e-mail server 109 via their respective IP addresses.

Annunciator 118 can comprise any suitable annunciator, including but not limited to a speaker, and bell, a buzzer, a synthesizer, a visual annunciator (e.g. a display, a light etc.) and the like, and/or a combination. In some embodiments, annunciator 118 and display device 115 can be combined in single respective display devices/annunciator. In other embodiments, annunciator 118 and speaker 116 can be combined a single annunciator/speaker device.

Each of microphone 114 and speaker 116 can comprise any suitable combination of microphones and speakers to enable receipt and delivery of voice communications at telephony device 101. In some embodiments, microphone 114 and speaker 116 can be combined in a handset and/or a headset, which can further include an actuator for indicating that a voice connection is to be completed (i.e. to "pick up the phone").

Figure 2:
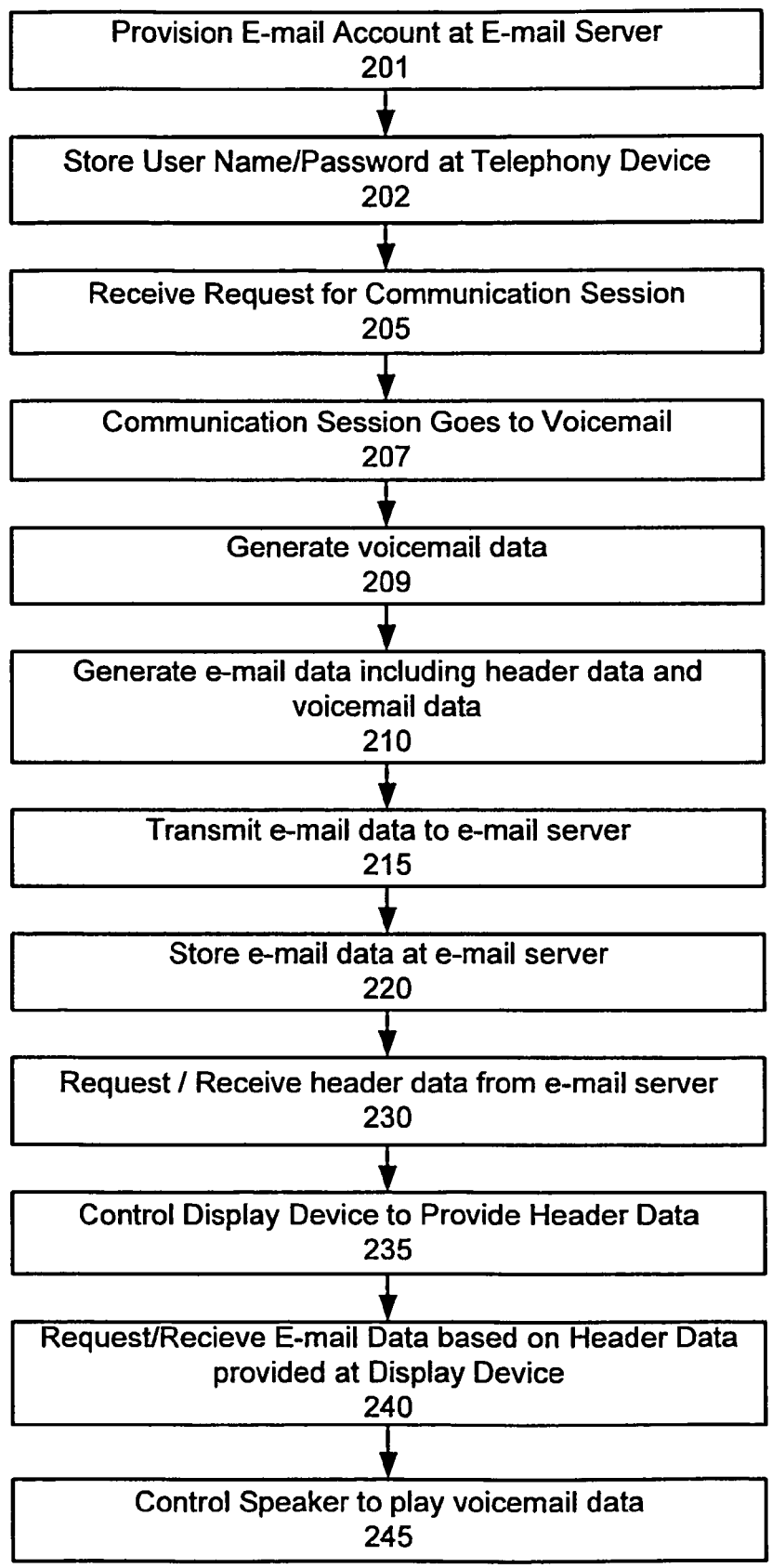
FIG. 2 depicts a method for storing voicemail, according to non-limiting embodiments.

Attention is now directed to FIG. 2 which depicts a method for storing voicemail, according to non-limiting embodiments. In order to assist in the explanation of the method, it will be assumed that the method is performed using the system 100. Furthermore, the following discussion of the method will lead to a further understanding of the system 100 and its various components. However, it is to be understood that the system 100 and/or the method can be varied, and need not work exactly as discussed herein in conjunction with each other, and that such variations are within the scope of present embodiments.

At step 201, an e-mail account is provisioned at e-mail server 109. For example, via an interaction with a webpage, a webmail account can be provisioned and username 170 and password 170 can be issued and/or selected. Such an interaction is generally known to persons skilled in the art, and indeed provisioning of webmail accounts is generally ubiquitous.

At step 202, username 170 and password 171 are stored at telephony device 101 via a provisioning process at telephony device 101. For example, in some embodiments, username 170 and password 171 can be received at telephony device 101 via input device 117. In other embodiments, an e-mail originating at e-mail server 109 can be transmitted to telephony device 101, the e-mail comprising username 170 and password 171, and received via interface 119, using a network address of telephony device 101. It is further understood that telephony device 101 is provisioned with a network address of e-mail server 109, which can comprise, without limitation an IP address, a web address, a URL and the like.

At step 205, a request for a communication session is received at telephony device 101 from telephony device 102, via link 105. In other words, telephony device 102 calls telephony device 101.

At step 207, presuming that the request for a communication session does not result in actuation of microphone 114 and/or speaker 116 (i.e. the call is not picked up), telephony device 101 responds to the request for a communication session by causing the communication session to be established between telephony device 102 and voicemail application 120 (i.e. the call goes to voicemail).

At step 209, voicemail data 106 is generated at telephony device 101, voicemail data 106 comprising a voice message. For example, a voicemail application 120 provides an oral indication within the communication session to leave a message and, once an indicator is provided (e.g. a "beep"), voicemail data 106 is generated by recording voice data conveyed to telephony device 101 from telephony device 102 within the communication session (e.g. a user of telephony device 102 leaves a message).

Once voicemail data 106 has been generated, as determined by at least one of voicemail application determining that the message is completed (e.g. when the message reaches a certain length, and/or an indication is received indicative that the message is complete (e.g. a button at telephony device 102 is actuated indicating that the message is complete)) and/or the communication session is terminated, at step 210, e-mail data 107 is generated. In general, e-mail data 107 comprises voicemail data 106 and header data 108. Header data 108 generally comprises data identifying voicemail data 106. For example, in some embodiments, header data 108 comprises caller-line ID information received via the request for a communication session and/or during the communication session. Header data 108 can further comprise a time and date that voicemail data 106 was generated (e.g. as determined by telephony device 101, in embodiments where telephony device 101 comprises a clock (not depicted) and/or in embodiments where telephony device 101 is enabled to request times and dates from an external device, such as a clock server and the like). In yet further embodiments, header data 108 can comprise data indicative that e-mail data 107 comprises voicemail data 106 (e.g. text such as "Voice Mail"). However, it is understood that the content and format header data 108 is not to be considered particularly limiting, presuming that header data 108 generally identifies voicemail data 106. In particular non-limiting exemplary embodiments, header data 108 can comprise the text "Voice Mail (416) 555 1234 May 5, 2:32 pm" indicating that voicemail data 106 was generated on May 5, at 2:32 pm from telephony device 102 associated with the phone number (416) 555 1234.

In some embodiments, at step 210 generating e-mail data 107 comprises attaching voicemail data 106 to e-mail data 107, however voicemail data 106 can be embedded and/or attached to e-mail data 107 in any suitable manner.

At step 215, e-mail data 107 is transmitted to e-mail server 109 via a network address associated with e-mail server 109 and link 110, such that e-mail data 107, including voicemail data 106, is stored at e-mail server 109 at step 220, for example within memory 123. E-mail data 107 can be stored in any suitable format, in association with username 170, for example within a web e-mail account 165.

It is understood that steps 205 through 220 can be repeated any suitable number of times such that a plurality of e-mail data, similar to e-mail data 107, is stored at e-mail server 109 within account 165, each comprising header data and voicemail data.

Hence, e-mail server 109 (e.g. a webmail server including a webmail mail account) can be used to store voicemail data, offloading the storage of voicemail from the entity associated with telephony device 101 to the entity associated with e-mail server 109. This reduces need for the capacity of memory 113, as voicemail is stored remotely and not at telephony device 101, and/or further eliminates the need for a voicemail server dedicated to storing voicemail for telephony device 101.

To retrieve voicemail, at step 230, telephony device 101 first requests and receives header data 108 from e-mail server 109. For example, as described below, in embodiments where e-mail server 109 comprises a POP3 e-mail server, a suitable POP3 "TOP" command is transmitted by telephony device 101 to e-mail server 109, which results in e-mail server 109 transmitting header data 108 to telephony device 101. In some embodiments, a plurality of header data is received from e-mail server 109 via telephony device 101 issuing any suitable number of requests.

Figure 3:
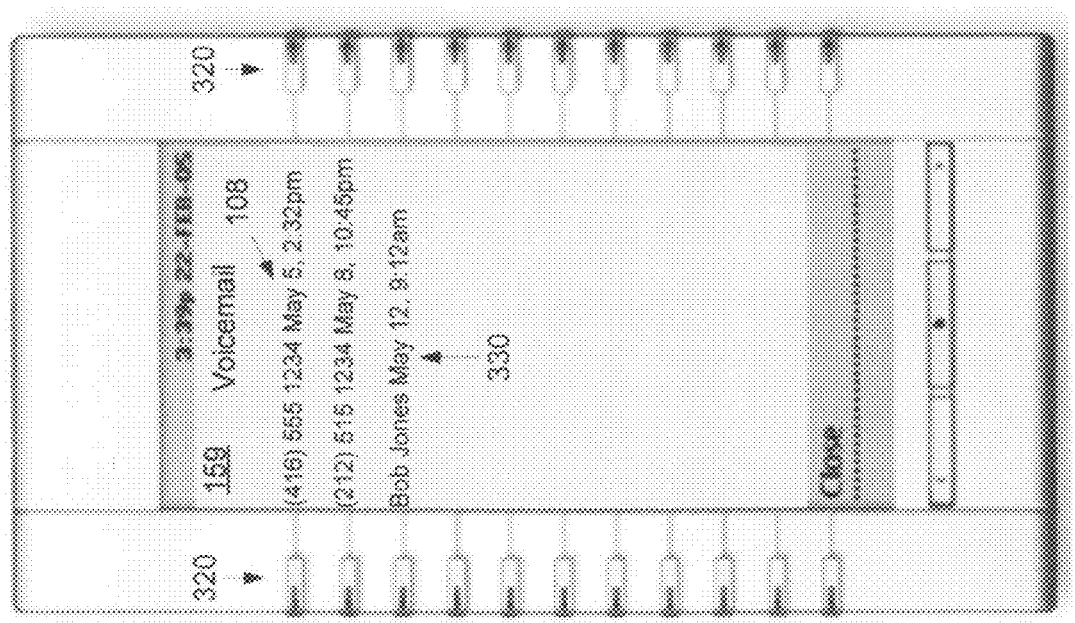
FIG. 3 depicts a display device for providing a representation of a list of voicemail, according to non-limiting embodiments.

At step 235, processing unit 111 at telephony device 101 then controls display device 115 to provide a representation of header data 108. For example, FIG. 3 depicts display device 115, display device 115 further including buttons 320. Display device 115 is being controlled to provide representation 159 comprising a representation of a plurality of header data 330 downloaded from e-mail server 109, according to non-limiting embodiments, including a representation of header data 108. It is understood, in these embodiments, that each of the plurality of header data 330 is associated with e-mail data stored at e-mail server 109, previously transmitted to e-mail server 109 from telephony device 101, including e-mail data 107. Hence, each of the plurality of header data 330 is further associated with respective voicemail data, including voicemail data 106, stored at e-mail server 109.

In some embodiments, e-mail data other than e-mail data associated with voicemail data (such as e-mail data 107) can be stored at e-mail server 109. In these embodiments, header data not associated with e-mail data 107 (and the like) can be received from e-mail server 109. However, such header data can be filtered based on the content of the header data. For example, if header data does not comprise text identifying voicemail data (e.g. does not comprise text "Voice Mail"), then the header data can be discarded at step 230. In this manner, if e-mail server 109 stores spam and/or junk mail within account 165, that has not been previously identified as spam and/or junk mail, header data associated with spam and/or junk mail will not be provided at display device 115 at step 235.

Figure 4:
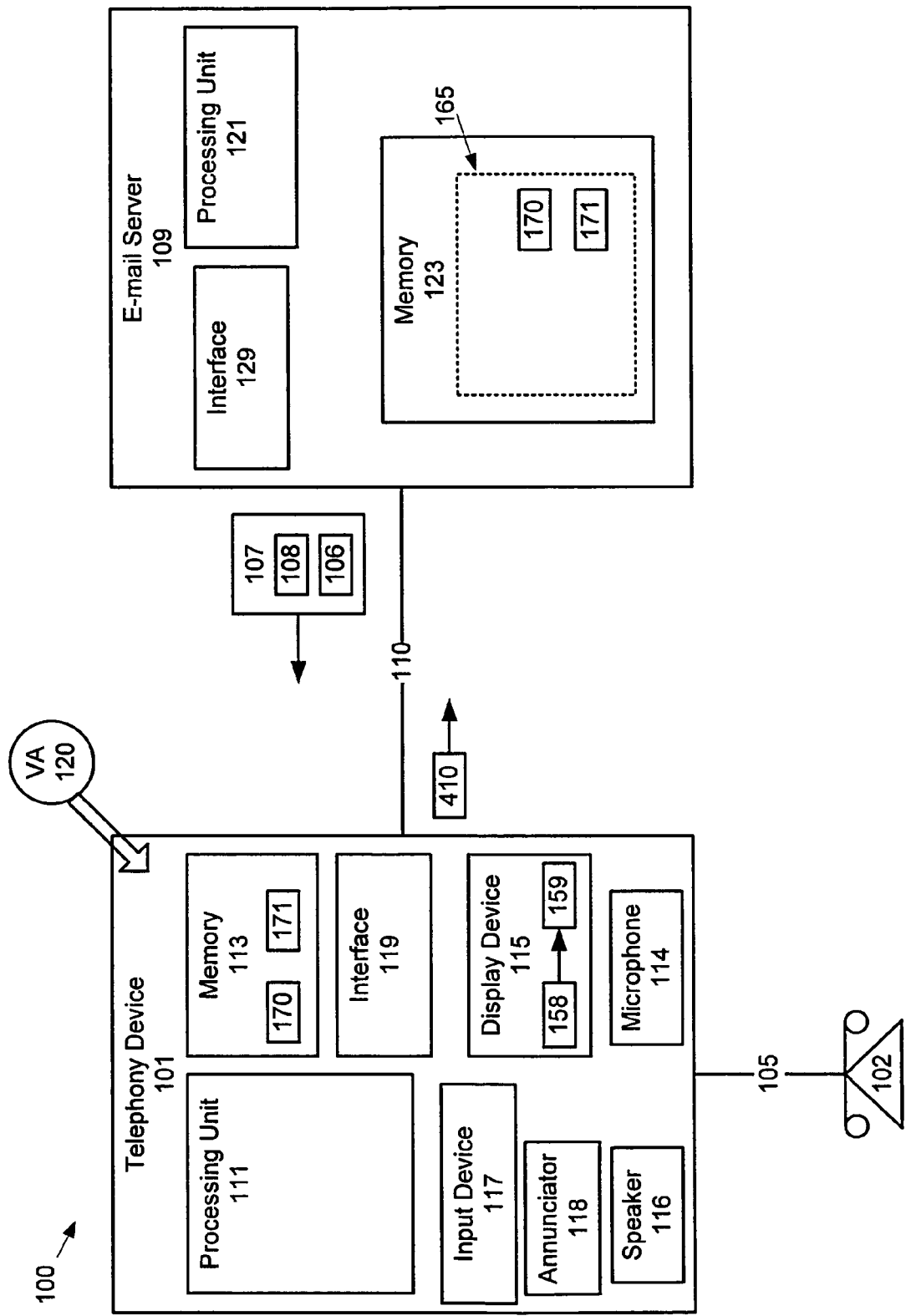

At step 240, e-mail data 107 is requested and received from e-mail server 109, including voicemail data 106. For example, input data can be received at telephony device 101 indicative that a button 320 adjacent representation of header data 108 has been actuated. Such input data then triggers retrieval of e-mail data 107, associated with header data 108. As depicted in FIG. 4, which is substantially similar to FIG. 1, with like elements having like numbers, telephony device 101 can then transmit a request 410 to e-mail server 109, the request 410 comprising a command for retrieving e-mail data 107. For example, as described below, in embodiments where e-mail server 109 comprises a POP3 e-mail server, a suitable POP3 "RETR" command is transmitted by telephony device 101 to e-mail server 109, which results in e-mail server 109 transmitting e-mail data 107 to telephony device 101. In general, such a RETR command further results in e-mail data 107 being deleted from e-mail server 109. In some embodiments, request 410 can further comprise username 170 and password 171 to enable automatic log-in to account 165 such that e-mail data 107 can be retrieved.

At step 245, processing unit 111 controls speaker 116 at telephony device 101 to play voicemail data 106 received in e-mail data 107 at step 240. Hence, voicemail stored at e-mail server 109 is retrieved and played.

In embodiments where e-mail data 107 is deleted at e-mail server 109 when e-mail data 107 is transmitted to telephony device 101, the method can further comprise a step for retransmitting e-mail data 107 (including header data 108 and voicemail data 106) back to e-mail server 109 after step 245, similar to step 215, such that e-mail data 215 is re-stored at e-mail server 109, for later retrieval by telephony device 101. Such a re-transmission can be triggered via input data indicative of actuation of a suitable one of buttons 320, as an option to "re-store" voicemail, provided within representation 159. Such a re-transmission is desirable in embodiments where voicemail data 106 stored at e-mail server 109 is to be retrieved by telephony devices other than telephony device 101 (and/or for long-term storage of voicemail data 106). For example, if telephony device 101 comprises a wired deskphone and retrieval of voicemail data 106 occurs via a remote and/or mobile telephony device enabled to access account 165, (e.g. steps 230-245 are implemented in a remote and/or mobile telephony device), then voicemail data 106 can be re-stored during such a re-transmission of e-mail data 107 for later retrieval by telephony device 101.

In some embodiments, e-mail data 107 stored at e-mail server 109 can be deleted via transmission of a suitable command from telephony device 101 to e-mail server 109. For example, once header data 108 is provided at display device 115, in step 235, input data indicative that e-mail data 107 associated with header data 108 is to be deleted, via receipt of input data indicative of actuation of a suitable one of buttons 320, as an option to "delete" voicemail, provided within representation 159. For example, as described below, in embodiments where e-mail server 109 comprises a POP3 e-mail server, a suitable POP3 "DELE" command is transmitted by telephony device 101 to e-mail server 109, which results in e-mail server 109 deleting e-mail data 107. Alternatively, with POP3, the delete function could be implemented by issuing a "RETR" command which retrieves e-mail data 107 and marks it for automatic deletion at the end of the current Transaction state. The retrieved data can then be ignored and/or discarded in these embodiments.

Figure 5:
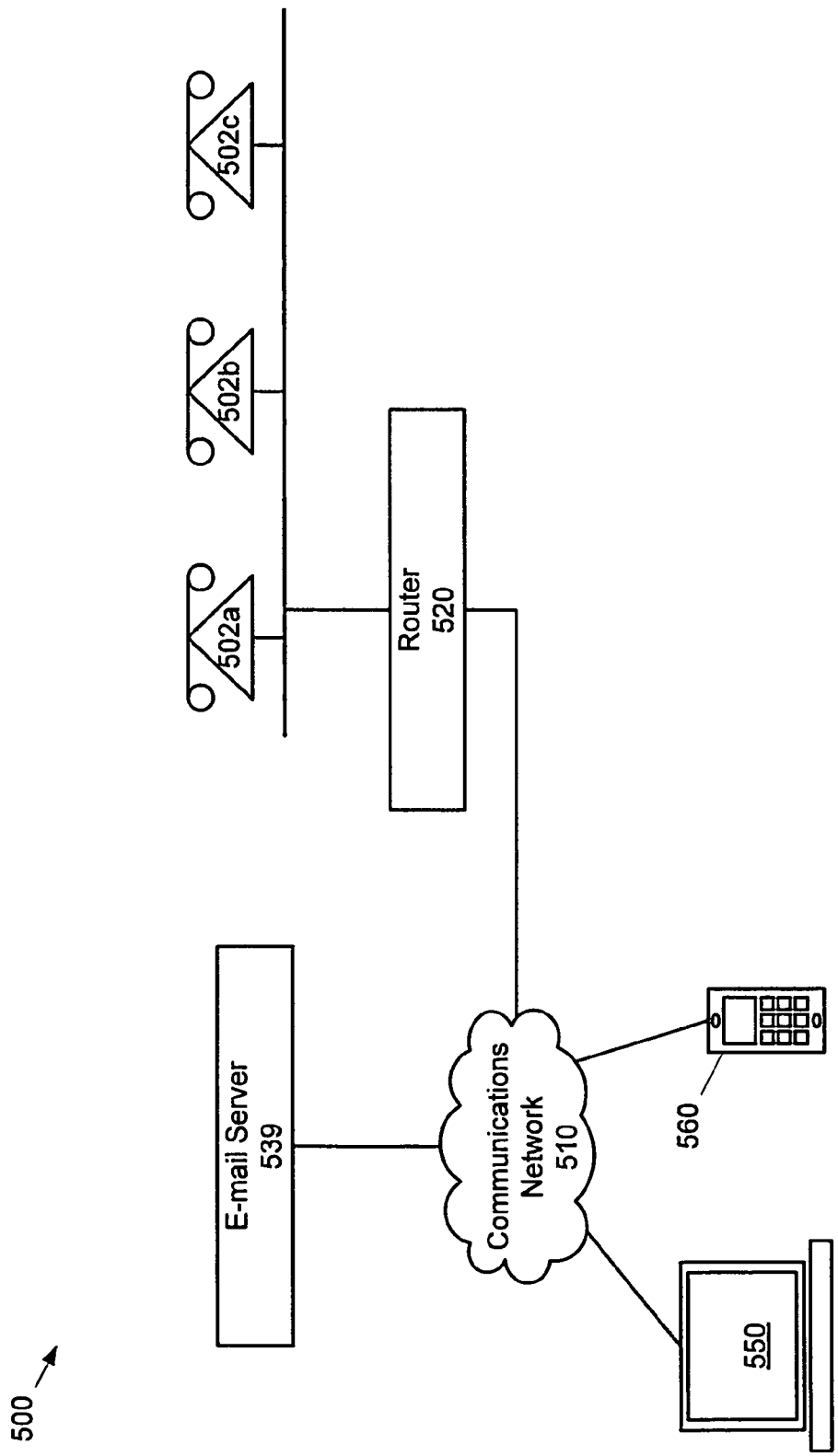

Attention is now directed to FIG. 5, which depicts a system 500 for storing voicemail according to particular non-limiting embodiments. The method can be implemented within system 500 for storage of voicemail. Furthermore, the following description of system 500 will illustrate storage of voicemail according to present non-limiting embodiments for a single telephone home and/or a very small office installation. System 500 comprises at least one telephony device 502a, 502b, 502c (collectively telephony devices 502, and generically telephony device 502) similar to telephony device 102, and enabled for VoIP communications. Telephony device 502 is in communication with a communications network 510 (including but not limited to the internet). In some embodiments, system 500 further comprises a router 520, and communications with communications network 510 occurs via router 520. In embodiments that comprise a plurality of telephony devices 502, telephony devices 502 can be networked in a local area network (LAN) with router 520. In general, telephony device 502 is enabled for voice and pure signal processing capability to encode and decode voice signals, handle compression and decompression requirements, cope with packet loss, delay and errors etc., and to supply a voicemail capability. Telephony device 502 can be further enabled for creation and reception of DTMF signals.

When a call is received at a telephony device 502, and it is deemed to require voicemail treatment, the call will be routed to an internal voicemail application within telephony device 502, such as an internal voicemail server (e.g. similar to voicemail application 120 and/or a combination of voicemail dedicated hardware and software elements). For the creation of voicemails, this voicemail server is enabled to play a greeting message to a caller indicating the capability to record a voicemail. This greeting message may be supplied by a user of telephony device 502 in a provisioning process, by a system wide management system similar to other configuration data or be part of telephony device 502 firmware. The voicemail server will be able to accept DTMF (and in some embodiments voice-based signals) to enable a calling party to control the recording of his/her voicemail in a conventional manner. Telephony device 502 is enabled to record a voicemail, for example in a suitable compressed format (e.g. ADPCM) including but not limited to techniques similar to compressing voice for transmission on communications network 510. With this, telephony device 502 will have the capability of preparing a voicemail in a suitable digital format (compressed or uncompressed).

System 500 further comprises an e-mail server 539, similar to e-mail server 109, in communication with communications network 510. In specific exemplary non-limiting embodiments, e-mail server 539 comprises a network-based SMTP e-mail server. Telephony device 502 is generally enabled to attach the recorded voicemail as a file to an SMTP (RFC2821 RFC2822 and RFC2045) style e-mail. It is understood that telephony device 502 further comprises a suitable e-mail client, such as an RFC2821 e-mail client. The e-mail will be sent to a mailbox/account on the SMTP server associated with a user of telephony device 502. Telephony device 502 will obtain this e-mail address from its configuration information, having been previously provisioned.

Header data for the e-mail will be filled in the normal way by telephony device 502 with the following exceptions: the "To:" portion of the header data comprises the users address at e-mail server 539; the "From:" portion of the header data comprises the same address; the "Subject:" portion of the header data comprises data about the voicemail that can be retrieved for later use. In some embodiments, the "Subject:" portion of the header data can comprise a key-value pairs (effectively acting as voicemail headers). Further content of the header data will be described below.

In some embodiments, voicemail specific data can be stored as a table on telephony device 502. This table can then be linked to voicemail data stored at e-mail server 539 via any suitable identifier that could be stored both with the voicemail data stored on e-mail server 539 and within the table stored on telephony device 502. However, in other embodiments, such linking of voicemail with telephony device 502 does not occur, such that a user associated with the voicemail stored on e-mail server 539 can register on other telephony devices (e.g. in hot desking scenarios, etc.) or access the voicemail data via other network device, such as a computing device 550 (e.g. a personal computer) and or a mobile communication device 560 (e.g. a PDA, mobile phone, and/or a combination). Storage of voicemail specific information with the voicemail data on e-mail server 539 enables such mobility. Indeed such capability is generally regarded as a commercially important aspect of communication and collaboration systems.

While communication between telephony device 502 and e-mail server 539 can occur via any suitable protocol, in specific non-limiting exemplary embodiments described here, communications can occur via the standard POP3 (RFC 1939) protocol: i.e. e-mail server 539 comprises a POP3 e-mail server. In some of these embodiments, described hereafter, e-mail server 539 is enabled to process the optional POP3 command "TOP".

Retrieval of voicemail data from e-mail server 539 comprises two separate types of operations. Firstly identifying information about the stored voicemail data is retrieved and presented at telephony device 502, so that voicemail data can be selected for presentation and playback. The identifying information can be presented at telephony device 502 using any suitable method, including but not limited to voice, text, graphics or a combination. For example, a TUI (telephone user interface) may indicate by voice the number of new and previously saved messages. For a display device (similar to display device 115) at telephony device 502, voicemail information such as length, sender, urgency, new or saved, . . . can be presented on the display device as a table.

Secondly, the voicemail data can be retrieved so that it can be presented at telephony device 502. Note that use of the POP3 protocol for a mobile user can present difficulties, addressed by present embodiments. For example, as POP3 is client/server architecture, it is assumed that messages will be retrieved from the mailbox by a specific client. Information such as the read/unread status of the mail is not maintained at e-mail server 539 and mail retrieved and deleted from e-mail server 539 is not available to other clients. This issue is addressed by retaining voicemail specific information in the POP3 SUBJECT header at the POP3 server. This enables access to, and control of, all active voicemail data from multiple clients. Details of how voicemail specific information can be maintained in a current state will be described below. Furthermore, in present embodiments, the POP3 (RFC1939) commands: RETR (Retrieve), DELE (Delete), TOP and QUIT are used.

It is understood that telephony device 502 comprises, or can obtain, the username (e.g. mailbox) name and password to authenticate telephony device 502 to e-mail server 539. While the following discussion is specific to telephony device 502, it is further understood that protocols and methods described herein can also be implemented in computing device 550 and/or mobile communication device 560. As indicated in RFC1939, after authentication, a POP3 server (i.e. e-mail server 539) enters a "Transaction" state. In this state, e-mail data can be retrieved. Upon entering the Transaction state, e-mail server 539 can assign sequential identifying numbers to individual e-mail data beginning with "1" and ending with the number of e-mail data currently stored. Hence, an e-mail client being opened at telephony device 502, telephony device 502 automatically authenticates with e-mail server 539, and then issues a series of TOP commands. The format of the TOP command is understood to be "TOP msg n" where "msg" is the identification number of the "msg" required and "n" is the number of lines of the message body that is required. Telephony device 539 hence issues a series of messages of the form "TOP msg 0" until e-mail server 539 returns an error message indicating that the message identity number is higher than the highest in e-mail server 539, indicating that telephony device 502 has accessed all e-mail data. The TOP commands issued generally return all headers for all stored e-mail data including the Subject: header data, which includes the voicemail specific information. Using the SUBJECT: header data, telephony device 502 can create the text and voice interfaces that described the new and previously heard messages that are stored at e-mail server 539. So with this, telephony device 502 can create a textual table of new and previously heard voicemail data stored at e-mail server 539, and/or a voice greeting that will indicate to telephony device 502 the availability of new and previously heard voicemail data stored at e-mail server 539.

With telephony device 502 primed with the voicemail specific information, individual voicemail data can be accessed via either text or voice interfaces. Specific voicemail data will then be selected for playback. To retrieve voicemail data, telephony device 502 can issue a "RETR msg" command to the e-mail server 539, which retrieves the e-mail data with the identity number "msg", and comprising the selected voicemail data, and transmits it back to telephony device 502. Once telephony device 502 received the voicemail data via receipt of the e-mail data, the voicemail data can be manipulated, played, saved, deleted etc as desired. Note that in accordance with the POP3 standard, e-mail data retrieved in this manner can be marked for deletion at the end of the Transaction state. A novel method of retaining e-mail data on e-mail server 539 after it is retrieved by telephony device 502 is described below.

To delete voicemail data from e-mail server 539, telephony device 502 can issue a "DELE msg" command in which "msg" is the identity number of the e-mail data comprising the voicemail data for deletion. The voicemail data to be deleted could either be one that has recently been accessed and is present at telephony device 502 or could be one or more that can be selected by means of an input device at telephony device 502. Alternatively, as noted above, the "RETR" command can be used for the deletion of voicemail data such that e-mail associated with the voicemail data is deleted at the end of a current Transaction state.

If voicemail data that has been retrieved as described above is to be retained, it can be marked for deletion at e-server 539 at the end of the current Transaction state in compliance with the normal operation of the POP3 standard. The retention of e-mail data and the associated voicemail data at e-mail server 539 can occur due to the novel use of the SUBJECT: header to retain voicemail specific information. Part of this information is a read/unread indicator. To make changes to the information stored at e-mail server 539, telephony device 502 will first make the changes in the version of voicemail data that it has recently received and then send it to e-mail server 539 using the SMTP MAIL command as described above. The previous version of the email data is marked for deletion at e-mail server 539 by the standard operation of the RETR command. The updated version will replace it. The e-mail server 529 will thus have a copy of the saved voicemail data with updated voicemail specific data.

In other words, it is understood that when e-mail data is retrieved from a POP3 server, it is set to be deleted automatically when the server receives the QUIT command to end the current Transaction state. In present embodiments, the client (e.g. at telephony device 502) is enabled to cause retrieved e-mail data to be retained at e-mail server 539 by resending retrieved e-mail data, and the associated voicemail data to e-mail server 539.

However, the saving of e-mail data/voicemail data as indicated above can create an issue in that a message identity number for the e-mail data has not been defined at the e-mail server 539. The behaviour of POP3 servers for e-mail data that has been received after a POP3 server has been authorized via receipt of the mailbox name and password and is still in the midst of the Transaction state is not defined within RFC139. In "normal" operation of a POP3 client and POP3 server, a POP3 client (e.g. telephony device 502) will download and process all available e-mail data. Furthermore, a timer process is generally provided to recurrently access POP3 server and maintain a complete copy of received e-mail data at a POP3 client. This can also be triggered manually in some clients. To overcome this and enable telephony device 502 to have access to all e-mail including those just saved, after the save process is done, telephony device 502 can issue a "POP3 "QUIT" command to e-mail server 539, which places e-mail server 539 in an UPDATE state in which all deleted e-mail data are removed and places e-mail server 539 in a state to be re-authorized. Telephony device 502 can then perform the authorization procedure as described above in authorization occurs and a series of TOP commands are issued. With this all e-mail data (and thereby attached voicemail data) will be issued with message identity numbers and which can be made available to telephony device 502.

The authorization process can be performed periodically to maintain an accurate list at the client of voicemail data (stored at e-mail server 539) on telephony device 502. In some embodiments, telephony device 502 is enabled to order a refresh of the list upon receipt of input data, while in other embodiments, such a refresh can be automatically performed periodically.

In any event, in contrast to the standard use of POP3 servers for storage of e-mail alone, voicemail storage is maintained at e-mail server 539. Telephony device 502 can be provided with a list of stored voicemail data and can access voicemail data presentation upon receipt of input data (e.g. as ordered by a user). The maintenance of the voicemail data on e-mail server 539 further enables access to voicemail data from multiple clients/telephony devices/communication devices and the like. For example voicemail data can be accessed from a telephone or from a suitably equipped client on a wireless device or hotel room PC.

As indicated earlier, POP3 normally expects that e-mail be maintained on a client and that a POP3 server will be emptied of e-mails by each client access. The POP3 server will assign message identity numbers during authorization to facilitate this. In general, however, this can be incompatible with multi-client access scenarios. For example, if multiple clients attempt to access e-mail server 539 at once there can be a difficulty since the current message identity number assignment cannot currently be shared, hence multiple clients cannot access individual e-mails unambiguously. For example, if two clients attempt to authorize, one set of message identity numbers will be lost and the client associated with lost message identity numbers will not know how to access individual e-mails. However, in some embodiments, the POP3 protocol can be modified to overcome this such that a plurality of message identity numbers are issued and e-mail server 539 can be enabled to manage multiple client interactions. Such a modification of the POP3 protocol is well within the skill of a person of skill in the art. Alternatively The Internet Message Access Protocol (IMAP) (RFC2060, RFC3501 and the like) can supply the capability of multi-client access and can be implemented in some embodiments for this In other embodiments, however, only one client (e.g. telephony device 502) is enabled to access e-mail server 539 at once. For example, voicemail data is understood to be associated with an individual user and that user is understood to be using only one telephony device, and the like, at a time to access them. Hence, in some embodiments, system 500 is enabled to inform telephony device 502 accessing a particular account/mailbox at e-mail server 539 that another telephony device 502 (and/or computing device 550 and/or mobile communication device 560) is now going to be accessing the same account/mailbox at e-mail server 539 to retrieve e-mail data/voicemail data. In other words a user changes clients and/or logs into a second client, without necessarily logging out of a first client. In some embodiments, this can be accomplished by sending a specially formatted e-mail to e-mail server 539 from a client that is being initialized for use.

Upon initialization, a client may send (using SMTP) e-mail server 539 an e-mail with the subject line containing the key-value pair "<Transfer><0>" or some other suitable unambiguous pair. When another client, which is periodically authorizing e-mail server 539 to maintain a list of e-mails, draws down the list of SUBJECT: headers with the "TOP msg 0" command, it can be enabled to process each SUBJECT header to determine if it contains this key-value pair. If this key-value pair is discovered, the client will immediately stop its periodic updating of the voicemail list, as it is understood that another client wishes to access e-mail data/voicemail data at the same account/mailbox.

Thus a client that wishes to take over management of voicemail data stored at e-mail server 539 will send the proper SMTP e-mail, wait for a suitable period of time (for example, 1 minute or so) for the previous client to detect the take over instruction and then begin to download header data using the TOP command as described above. Hence, in these embodiments, a user can be logged into multiple clients, which can access a given account/mailbox at e-mail server 539, one client at a time.

In some embodiments exclusive client access to stored voicemail data can be implemented by storing a password in the Transfer key-value pair. For example, e-mail data having a Subject line in the header data comprising <Transfer><pwd> can be sent in which 'pwd" is a suitably formatted password. For enhanced security, the password can be an encrypted version of the current date and time or any other suitable information. This can make replay attacks on the protocol more difficult. A client receiving a request could decrypt the password with a known key and determine if it is of suitable form.

In general, then a standard COTS (commercial—off the shelf) POP3 and SMTP server can be used to store voicemail data, with no modifications. Indeed, as POP3 and SMTP servers are currently an industry standard configuration, it is understood that almost any commercial server can be used. A service provider can thus provide a centralized server for voicemails without incurring any additional expense beyond that of supplying an e-mail service. Furthermore, large enterprises can centralize the storage of voicemails for branch office locations thus reducing expense.

Furthermore, many network service providers provide such servers on their networks for free or a nominal charge for essentially unlimited service (e.g. free webmail). These services have both SMTP and POP3 access as standard items. Thus a home or small business can take advantage of the very low cost of these services to provide, for themselves, a low cost, network accessible voicemail service.

The SUBJECT: line voicemail specific information is described. For example, a set of key-value pairs can be used to carry the voicemail specific information. In some embodiments, key-value pairs can be delimited by angled brackets and commas as in the following example:

<Key1><Value1>,<Key2><value2>, . . .

Furthermore, in some non-limiting embodiments the voicemail specific information can contain one or more of the following data:

Sender Name
Sender Telephone Number
Date and Time of Day Sent
Length of Message
Read/Unread Flag In some embodiments, telephony device 502 can be enabled to provide a folder system for the storage of voicemail data on telephony device 502, the indicators for the one or more folders with which the voicemail data is associated can be specified within the key-value pairs. For example, for each respective voicemail data, associated header data can comprise an indication of the folders to which they belong. These indicators can be of the form of a key-value pair <Folder><name of folder>. To enter given voicemail data in a folder, the appropriate key-value pair can be placed in respective header data. To remove voicemail data from a folder, the folder's key-value pair can be removed from the respective header data. In some embodiments, voicemail data can be stored in a plurality of folders, and furthermore any suitable number of folders can be created. In some embodiments, such folders can be used as a means of selecting which header data and/or voicemail is to be displayed at the client/telephony device. The folder which is to be displayed can be indicated via input data received at the client/telephony device. The client/telephony device will then retrieve all header data in the specified folder, as described above, such that the header data identified as belonging to the specified folder can be provided.

Hence, in general, present embodiments described herein provide for storage of voicemail data home, SOHO (small office/home office) and branch office applications without incurring the expense of a specialized voicemail server. The capability of standard VoIP phones is combined with a standard COTS (POP3, SMTP) e-mail server via a protocol that enables storage and access of voicemails. This protocol can also be used for access by multiple clients to a POP3 server.

Many commercial dedicated voicemail systems supply features for the handling of received voicemails. For example, voicemails can be forwarded to other telephony devices with annotations etc. In present embodiments, similar features can be implemented with standard e-mail features available on commercial e-mail systems. For example, the forwarding of and replying to voicemails can be accomplished by the standard e-mail forwarding features of the same form. The e-mail containing the attached voicemail can be forwarded to a voicemail account (or accounts if multiple recipients are selected). The existing header information can be encapsulated into a new key-value (e.g. <OLD_Header><contents of old header> pair of the header of the new e-mail and the rest of header set up to convey the voicemail information in the normal manner.

The addition of voice annotations to forwarded or replied to e-mail can be accomplished by creating and adding another voice attachment to the e-mail. Textual annotations can be accomplished by placing the desired text in the body of the e-mail. The client/telephony device can be enabled to extract both voice and textual attachments Privacy and security of voicemails using commercial e-mail servers can be accomplished using any suitable methods to encrypt and make non-reputable the attached voicemails and to encrypt and make non-reputable the header information describing that voicemail. In some embodiments, the voicemail attachment can be encrypted with S-MIME. This will obscure the voicemail so that only the recipient can decrypt it and sign it with a digest that verifies that it comes from a specific user/client/telephony device and has not been changed. Similarly, the header data describing the voicemail can opaque to A commercial Email server in that the server is unaware of the format of the header data, which can also be encrypted with any suitable encryption system (such as PGP, in some embodiments) that hides it from other parties, both at the server and during transmission. Encryption for both the header data and the voicemail attachment can take place at the client/telephony device.

Note that although voicemail data has been described in present embodiments, in other embodiments any suitable multi-media data (e.g. voice data, video data, animation data etc.) can be stored and retrieved in a similar manner at an e-mail server.

Those skilled in the art will appreciate that in some embodiments, the functionality of telephony device 101, telephony devices 502, computing device 550 and mobile communications device 560 can be implemented using pre-programmed hardware or firmware elements (e.g., application specific integrated circuits (ASICs), electrically erasable programmable read-only memories (EEPROMs), etc.), or other related components. In other embodiments, the functionality of telephony device 101, telephony devices 502, computing device 550 and mobile communications device 560 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Alternatively, the computer-readable program code could be stored remotely but transmittable to these components via a modem or other interface device connected to a network (including, without limitation, the Internet) over a transmission medium. The transmission medium can be either a non-wireless medium (e.g., optical and/or digital and/or analog communications lines) or a wireless medium (e.g., microwave, infrared, free-space optical or other transmission schemes) or a combination thereof.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

What is claimed is:

1. A method for storing voicemail data comprising, generating said voicemail data at a telephony device engaged in a communication session with a calling telephony device, said voicemail data comprising a voice message;

automatically generating e-mail data at said telephony device after said voicemail data is generated, said e-mail data comprising data identifying said voicemail data, said e-mail data further comprising said voicemail data; and transmitting, from said telephony device, said e-mail data to a network address associated with a remote e-mail server, such that said e-mail data, including said voicemail data, is stored at said remote e-mail server.

2. The method of claim 1, further comprising:

requesting, from said telephony device, said data identifying said voicemail data from said remote e-mail server; and controlling a display device at said telephony device to provide a representation of said data identifying said voicemail data.

3. The method of claim 2, further comprising:

requesting, from said telephony device, said e-mail data from said remote e-mail server, including said voicemail data; and providing said voicemail data at said telephony device via at least one of a speaker at said telephony device and said display device.

4. The method of claim 3, further comprising:

retransmitting said e-mail data, including said data identifying said voicemail data and said voicemail data, to said remote e-mail server, such that said e-mail data is restored at said remote e-mail server, for later retrieval by at least one of said telephony device and a second telephony device.

5. The method of claim 1, further comprising:

requesting, at a second telephony device, said data identifying said voicemail data from said remote e-mail server;

controlling a display device at said second telephony device to provide a representation of said data identifying said voicemail data;

requesting said e-mail data from said remote e-mail server, at said second telephony device, including said voicemail data; and controlling a speaker at said second telephony device to play said voicemail data.

6. The method of claim 1, wherein said data identifying said voicemail data is located in a header of said e-mail data.

7. The method of claim 1, wherein folders for said voicemail data are generated at said telephony device via said data identifying said voicemail data.

8. The method of claim 1, further comprising at least one of:

forwarding said voicemail data;

replying to said voicemail data; and encrypting at least one of said voicemail data and said data identifying said voicemail data.

9. The method of claim 1, wherein:
said remote e-mail server comprises a POP3 e-mail server, and said data identifying said voicemail data is retrievable by said telephony device using a POP3 TOP command transmitted to said remote e-mail server;
said e-mail data, including said voicemail data, is retrievable by said telephony device using a POP3 RETR command transmitted to said remote e-mail server; and
said e-mail data is deletable at said remote-mail server by at least one of:
transmitting a POP3 DELE command from said telephony device to said remote e-mail server; and
transmitting said POP3 RETR command from said telephony device to said remote e-mail server such that said e-mail data is automatically deleted upon receipt of said POP3 RETR command at said remote e-mail server.

10. The method of claim 1, wherein said generating said e-mail data comprises attaching said voicemail data to said e-mail data.

11. A telephony device for causing storage of voicemail data, the telephony device comprising:
a processing unit interconnected with a memory, a display device and a communication interface, said processing unit enabled to:
generate voicemail data when said telephony device is engaged in a communication session with a calling telephony device via said communication interface, said voicemail data comprising a voice message;
automatically generate e-mail data after said voicemail data is generated, said e-mail data comprising data identifying said voicemail data, said e-mail data further comprising said voicemail data; and
transmit said e-mail data to a network address associated with a remote e-mail server, via said communication interface, such that said e-mail data, including said voicemail data, is stored at said remote e-mail server.

12. The telephony device of claim 11, wherein said processing unit is further enabled to:
request said data identifying said voicemail data from said remote e-mail server; and
control said display device to provide a representation of said data identifying said voicemail data.

13. The telephony device of claim 12, wherein said processing unit is further enabled to:
request said e-mail data from said remote e-mail server, including said voicemail data; and
provide said voicemail data at said telephony device via at least one of a speaker at said telephony device and said display device.

14. The telephony device of claim 13, wherein said processing unit is further enabled to:
retransmit said e-mail data, including said data identifying said voicemail data and said voicemail data, to said remote e-mail server, such that said e-mail data is re-stored at said remote e-mail server, for later retrieval by at least one of said telephony device and a second telephony device.

15. The telephony device of claim 11, wherein said data identifying said voicemail data is located in a header of said e-mail data.

16. The telephony device of claim 11, wherein folders for said voicemail data are generated at said telephony device via said data identifying said voicemail data.

17. The telephony device of claim 11, wherein said processing unit is further enabled to at least one of:
forward said voicemail data, via said communication interface;
reply to said voicemail data, via said communication interface; and
encrypt at least one of said voicemail data and said data identifying said voicemail data.

18. The telephony device of claim 11, wherein said telephony device comprises a VoIP telephony device.

19. The telephony device of claim 11, wherein said generating said e-mail data comprises attaching said voicemail data to said e-mail data.

20. A system for storing voicemail data, comprising:
at least one telephony device comprising a processing unit interconnected with a memory, a display device and a communication interface, said processing unit enabled to:
generate voicemail data when said telephony device is engaged in a communication session with a calling telephony device via said communication interface, said voicemail data comprising a voice message;
automatically generate e-mail data after said voicemail data is generated, said e-mail data comprising data identifying said voicemail data, said e-mail data further comprising said voicemail data; and
transmit said e-mail data to a network address associated with a remote e-mail server, via said communication interface, such that said e-mail data, including said voicemail data, is stored at said remote e-mail server;
at least one e-mail server in communication with said at least one telephony device via a communication network, said at least one e-mail server enabled to receive said e-mail data and store said e-mail data, including said voicemail data.

21. A method for storing voicemail data comprising,
generating said voicemail data at a first telephony device engaged in a communication session with a calling telephony device, said voicemail data comprising a voice message;
automatically generating e-mail data at said first telephony device after said voicemail data is generated, said e-mail data comprising data identifying said voicemail data, said e-mail data further comprising said voicemail data;
transmitting, from said first telephony device, said e-mail data to a network address associated with a remote e-mail server, such that said e-mail data, including said voicemail data, is stored at said remote e-mail server;
requesting, at a second telephony device, said data identifying said voicemail data from said remote e-mail server;
controlling a display device at said second telephony device to provide a representation of said data identifying said voicemail data;
requesting said e-mail data from said remote e-mail server, at said second telephony device, including said voicemail data; and
controlling a speaker at said second telephony device to play said voicemail data.

22. A method for storing voicemail data comprising,
generating said voicemail data at a telephony device engaged in a communication session with a calling telephony device, said voicemail data comprising a voice message;
automatically generating e-mail data at said telephony device after said voicemail data is generated, said e-mail data comprising data identifying said voicemail data, said e-mail data further comprising said voicemail data; and transmitting, from said telephony device, said e-mail data to a network address associated with a remote POP3 e-mail server, such that said e-mail data, including said voicemail data, is stored at said e-mail server and said data identifying said voicemail data is retrievable by said telephony device using a POP3 TOP command transmitted to said e-mail server, said e-mail data, including said voicemail data, is retrievable by said telephony device using a POP3 RETR command transmitted to said e-mail server, and said e-mail data is deletable at said e-mail server by at least one of transmitting a POP3 DELE command from said telephony device to said e-mail server; and transmitting said POP3 RETR command from said telephony device to said e-mail server such that said e-mail data is automatically deleted upon receipt of said POP3 RETR command at said e-mail server.

* * * * *